(12) United States Patent
Lazzeroni et al.

(10) Patent No.: US 7,457,423 B2
(45) Date of Patent: Nov. 25, 2008

(54) MULTI-ACCESSORY VEHICLE AUDIO SYSTEM, SWITCH AND METHOD

(76) Inventors: John J. Lazzeroni, 1415 S. Cherry Ave., Tucson, AZ (US) 85713-1997; Larry E. Stafford, 1625 E. Twin Acres Dr., Chandler, AZ (US) 85249

( * ) Notice: Subject to any disclaimer, the term of this patent is extended or adjusted under 35 U.S.C. 154(b) by 1092 days.

(21) Appl. No.: 09/923,280

(22) Filed: Aug. 6, 2001

(65) Prior Publication Data

US 2003/0026440 A1 Feb. 6, 2003

(51) Int. Cl.
*H04B 1/00* (2006.01)
*H04B 3/00* (2006.01)
*H04B 7/00* (2006.01)
*H02B 1/00* (2006.01)
*H04M 1/00* (2006.01)

(52) U.S. Cl. .............................. 381/86; 381/77; 381/80; 381/81; 381/123; 455/41.2; 455/575.2; 455/556.1

(58) Field of Classification Search ................. 381/123, 381/86, 85, 80, 81, 77; 455/575.2, 556.1, 455/41.2
See application file for complete search history.

(56) References Cited

U.S. PATENT DOCUMENTS

| | | | | |
|---|---|---|---|---|
| 3,586,977 A | * | 6/1971 | Lustig et al. ................. | 455/351 |
| 4,347,510 A | * | 8/1982 | Ishigaki et al. .............. | 381/123 |
| 4,484,344 A | * | 11/1984 | Mai et al. .................... | 704/233 |
| 4,754,486 A | | 6/1988 | Stafford et al. | |
| 4,977,975 A | | 12/1990 | Lazzeroni et al. | |
| 5,243,640 A | * | 9/1993 | Hadley et al. ............. | 455/426.1 |
| 5,329,593 A | | 7/1994 | Lazzeroni et al. | |
| 5,635,925 A | * | 6/1997 | Kishi et al. .................. | 340/996 |
| 5,722,069 A | * | 2/1998 | Donner ....................... | 455/418 |
| 5,910,996 A | * | 6/1999 | Eggers et al. ............... | 381/107 |
| 6,272,362 B1 | * | 8/2001 | Wang ....................... | 455/569.2 |
| 6,316,713 B1 | * | 11/2001 | Furst et al. .................... | 84/726 |
| 6,420,975 B1 | * | 7/2002 | DeLine et al. ........... | 340/815.4 |
| 6,493,450 B1 | * | 12/2002 | Scheuer et al. ................ | 381/57 |
| 6,594,366 B1 | * | 7/2003 | Adams ........................ | 381/74 |

OTHER PUBLICATIONS

Applicant's admitted prior art, p. 1, line 11-p. 2, line 16.*

* cited by examiner

*Primary Examiner*—Vivian Chin
*Assistant Examiner*—Devona E. Faulk
(74) *Attorney, Agent, or Firm*—Dale F. Regelman

(57) ABSTRACT

A multi-accessory vehicle audio system is providing that includes a plurality of vehicle audio accessories, the vehicle audio accessories generating a corresponding plurality of audio signals; and an audio switching device. The audio switching device includes an input section for receiving the audio signals from the vehicle audio accessories, a switching section operatively coupled to the input section for receiving the audio signals, a controller operatively coupled to the input section for receiving the audio signals and operatively coupled to the switching section for providing control signals to control the switching section and to regulate the output of the audio signals from the switching section according to an instruction set, and an output section operatively coupled to the switching section for receiving the regulated audio signals outputted from the switching section.

31 Claims, 11 Drawing Sheets

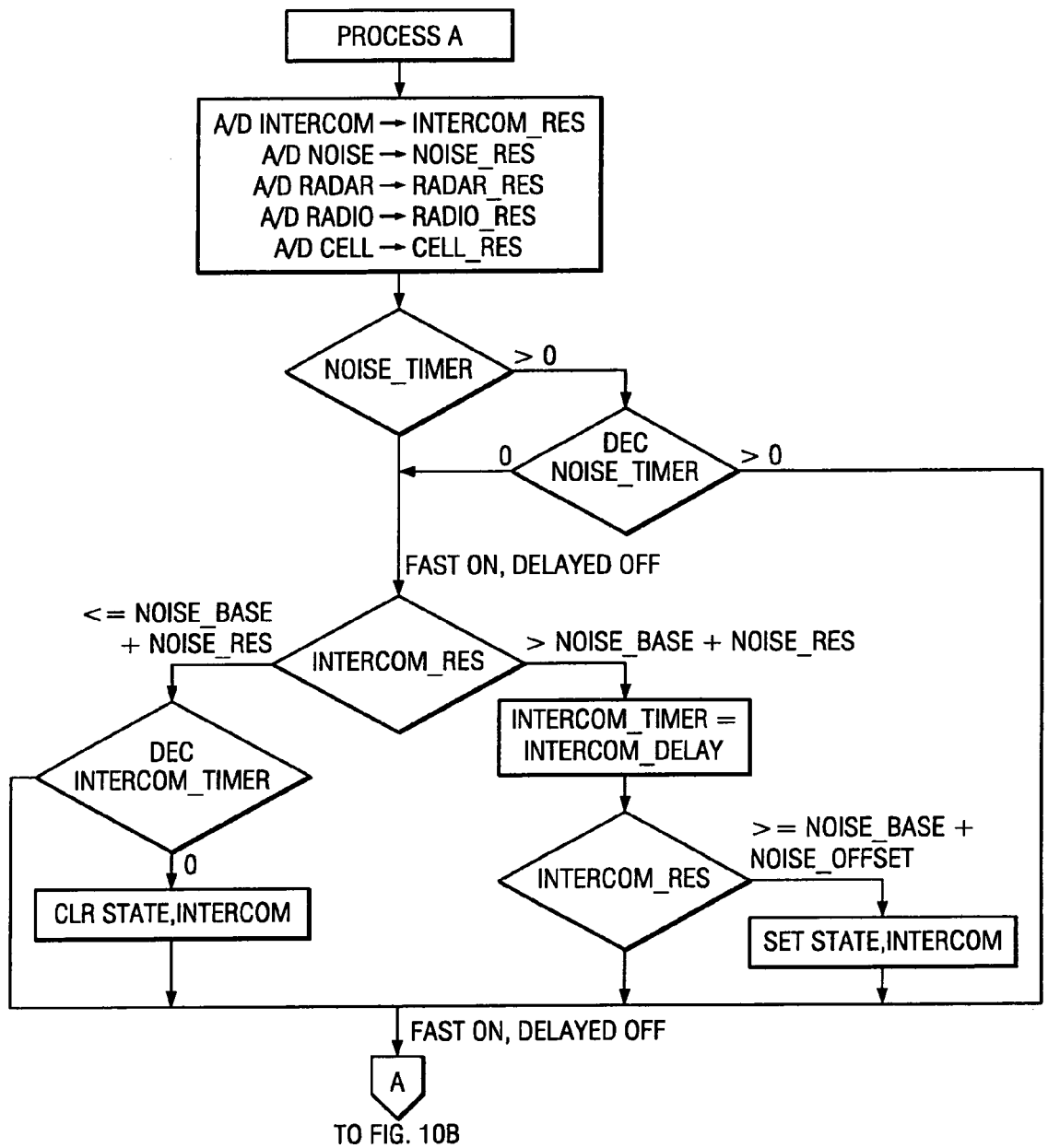

MULTI-ACCESSORY VEHICLE AUDIO SYSTEM, SWITCH AND METHOD

BACKGROUND OF THE INVENTION

1. Field of the Invention

This invention relates generally to audio switching systems and methods and, more specifically, to audio switching systems and methods involving switching of multiple audio accessories of a vehicle. The invention in its various embodiments is useful in such applications, for example, as an audio system switching device for a motorcycle or other vehicle in which a helmet headset is used, although other applications are possible.

2. Description of the Related Art

The availability of various audio accessories has increased significantly in recent years. There has been a continuing increase in the types and varieties of such accessories, their quality and capabilities, their general availability, and their use. Examples of such accessories include am or fm radios, citizen's band ("CB") radios, stereos, intercoms, tape and compact disk ("CD") players, general mobile communication devices or radios, and cellular telephones. Geo-locating systems such as Global Positioning Satellite ("GPS") systems also are provided with audio outputs, as are radar detectors. New accessories are continuing to be introduced into the market regularly, and the capabilities and features of those already on the market continue to advance.

Where more than one of such accessories are available to a user, it is often necessary or desirable to having a switching capability so that the user may select between the various accessories. This is particularly beneficial, for example, where it is desirable for the user to switch such devices conveniently, or where automatic switching is desired. In vehicles, for example, the user typically is the operator of the vehicle, and must focus his or her attention on the proper operation of the vehicle. In this instance, a means for switching between various audio accessories while minimizing the diversion of the user's attention away from operating the vehicle is important.

Such switching devices are particularly useful in the context of motorcycles such as touring bikes that commonly are equipped with many or all of the audio accessories noted above. Such motorcycles also may include or operate in conjunction with helmet headsets, e.g., for driver and passenger, each of which includes a microphone and a pair of helmet speakers. The same may apply to other types of vehicles in which the user or operator is subject to ambient wind and road or environmental noise, such as snowmobiles, all terrain vehicles, water craft, and the like. In some such vehicles, where they are adapted for operation with one or more passengers, the audio system or systems may include an intercom system for communication among the various individuals using the vehicle.

Accordingly, there has been a general need for switching between and among these various audio accessories. One such switching means involves a discrete switch physically available to the user in which the user is given the capability to mechanically move a dial or lever to one of a variety of positions to select a particular accessory. This approach has been limited, however, for example, in that it generally only provides for the selection of one such accessory at a time, and typically does not afford the flexibility of selecting multiple accessories simultaneously. It also usually requires that the user make a different selection each time a different accessory is desired, and does not afford the flexibility of automatic or semi-automatic selection.

It is also desirable in some applications that the accessories be selected in a particular sequence or pattern that is suited to the specific platform, application, and user needs. On a touring motorcycle, for example, it is often desirable for the headset microphones to override all other audio accessories, whereas this may not be true on a different vehicle under different circumstances. Prior approaches have not generally lent themselves to the use of such things as timing variations in switching from one accessory to another.

3. Objects of the Invention

Accordingly, an object of the invention is to provide an audio switching system and method that afford switching among various audio accessories. Another an object of the invention is to provide an audio switching system and method that afford switching among various audio accessories Another an object of the invention is to provide an audio switching system and method that afford switching among various audio accessories in a manner that is convenient for the user.

Another an object of the invention is to provide an audio switching system and method that afford switching among various audio accessories in a manner that can provide for variations in timing of selection between the various accessories.

Additional objects and advantages of the invention will be set forth in the description, which follows, and in part will be apparent from the description, or may be learned by the practice of the invention. The objects and advantages of the invention may be realized and obtained be means of the instrumentalities and combinations pointed out in the appended claims.

SUMMARY OF THE INVENTION

To achieve the foregoing objects, and in accordance with the purposes of the invention as embodied and broadly described in this document, a multi-accessory vehicle audio system is provided that comprises a plurality of vehicle audio accessories, an audio switching device. The vehicle audio accessories may comprise any one of a variety of devices that generate an audio signal. The audio switching device comprises an input section for receiving the audio signals from the vehicle audio accessories, a switching section operatively coupled to the input section for receiving the audio signals, a controller operatively coupled to the input section for receiving the audio signals and operatively coupled to the switching section for providing control signals to control the switching section and to regulate the output of the audio signals from the switching section according to an instruction set, and an output section operatively coupled to the switching section for receiving the regulated audio signals outputted from the switching section.

The vehicle audio system may comprise a music source, a microphone such as a headset microphone, a wireless communications device such as a cellular telephone, a general mobile communications device, and a radar detection system.

In the presently preferred embodiment according to this aspect of the invention, the vehicle accessories comprise a first level music source and a second level music source, and the input section comprises a switch for switching between the first and second music sources. Also in this embodiment, the vehicle audio accessories comprise a general mobile communications device having a general mobile communications device audio signal and a citizen's band radio having a citizen's band radio audio signal, and the input section includes coupling circuitry for combining the general mobile communications device audio signal and the citizen's band radio audio signal. In this embodiment, the vehicle audio accessories comprise a geographic designation system having a geographic designation system audio signal and a radar detection system having a radar detection system audio signal, and the input section includes coupling circuitry for combining the geographic designation system audio signal and the radar detection audio signal. Preferably the input section includes signal leveling circuitry for leveling the audio signals with respect to one another.

The switching section preferably comprises a plurality of switches. In the currently embodiment, the switching section comprises a plurality of analog switches.

The controller in presently preferred embodiments comprises a programmable controller chip which is programmed to perform the instructions of the instruction set. In the presently preferred embodiment, the instruction set comprises an instruction for controlling the switching section in response to the microphone audio signal. As a specific example, the input section comprises a microphone audio signal path and a low pass filter in the microphone audio signal path, the low pass filter having a low pass filter output, and the instruction set comprises an instruction for comparing the microphone audio signal with the low pass filter output to obtain a voice difference signal and an instruction for controlling the switching section in response to the voice difference signal.

The output section may include appropriate signal conditioning and/or filtering circuitry, amplification for example, and preferably speakers. In the presently preferred embodiment, the output section comprises a pair of speakers. The invention according to another aspect comprises a vehicle audio system switching device for switching a plurality of vehicle audio accessories. This switching device is as described above in connection with the vehicle audio system.

In accordance with another aspect of the invention, a method is provided for switching signals in a multi-accessory vehicle audio system having a plurality of vehicle audio accessories. The vehicle audio accessories may be as described above, and also generate a corresponding plurality of audio signals. The method comprises inputting the audio signals into a switching section, inputting the audio signals into a controller operatively coupled to the switching section and providing control signals from the controller to the switching section to control the switching section and to regulate the output of the audio signals from the switching section according to an instruction set; and outputting the audio signals from the switching section.

BRIEF DESCRIPTION OF THE DRAWINGS

The accompanying drawings, which are incorporated in and constitute a part of the specification, illustrate presently preferred embodiments and methods of the invention and, together with the general description given above and the detailed description of the preferred embodiments and methods given below, serve to explain the principles of the invention.

FIGS. 10A and 10B show the Process A as reflected in FIG. 8;

DETAILED DESCRIPTION OF THE PREFERRED EMBODIMENTS AND METHODS

Figure 1:
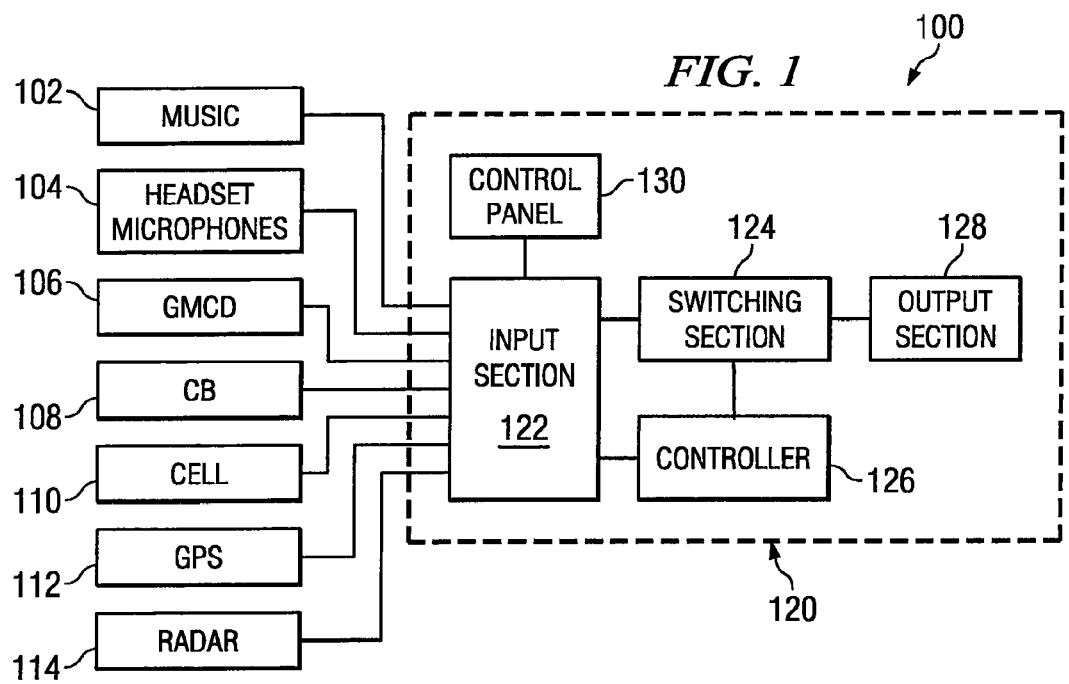
FIG. 1 is a functional block diagram of a presently preferred embodiment of the invention according to one aspect.

Reference will now be made in detail to the presently preferred embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments. The invention according to its various aspects is particularly pointed out and distinctly claimed in the attached claims read in view of this specification, and appropriate equivalents.

In accordance with one aspect of the invention, a multi-accessory vehicle audio system is provided. To illustrate this aspect of the invention, a multi-accessory vehicle audio system 100 according to a presently preferred embodiment of this aspect of the invention is shown in FIG. 1. This system 100 is adapted for use on a touring motorcycle (not shown), although as noted above, the invention is not necessarily limited to this application.

In accordance with this aspect of the invention, the vehicle audio system 100 comprises a plurality of vehicle audio accessories. These audio accessories may take a variety of forms. Those identified herein with respect to the preferred embodiment and methods are merely examples, but constitute presently preferred examples.

In accordance with the presently preferred embodiments, the vehicle audio accessories comprise a music source 102 such as the music or stereo systems that typically come with vehicles such as touring motorcycles. These may be standard equipment, or they may constitute upgraded or even retrofitted stereo or other music systems. Such systems commonly include such music sources as am and fm radio, compact disc, cassette tape, MP3 device, and/or the like. The music system also may include multiple types or levels. In a motorcycle audio system, for example, it is possible to mount a portable music device, such as a portable compact disc player or portable cassette player, on the vehicle. The stereo system installed in the motorcycle in this case normally would have a relatively high level, e.g., a high voltage and power level, whereas the portable music device normally would have a relatively lower voltage and output power. In this preferred embodiment, provision is made for a factory-installed or other vehicle installed stereo, as well as a hand-held or portable music device such as a portable cassette or CD player.

The vehicle accessories also include a helmet headset microphone 104, and preferably two such microphones, one for the driver and one for the passenger. The microphone or microphones 104 may comprise any one of a number of designs. In this preferred embodiment, the microphones are part of a helmet headset, such as the Model HS-ECD374-OF or Model HS-ECD271-OF headsets, commercially available from J&M Corporation of Tucson, Ariz., which are equipped with an AEROMIKE® microphone, or other microphone, for example, such as those described in with U.S. Pat. No. 5,329,593, issued to Lazzeroni and Carevich. The helmet headset of which microphone 104 is a part preferably includes at least one speaker, and preferably at least two helmet-mounted speakers.(not show), which in this preferred embodiment comprise a pair of DYNAPORT® speakers such as those commercially available as a component of J&M's headset systems noted above, or other speakers designed in accordance with U.S. Pat. No. 4,977,975, issued to Lazzeroni and Carevich.

Vehicle accessories also include a general mobile communications device 106, otherwise known as a family radio service (FRS.) These devices, generically referred to herein as general mobile communications devices ("GMCD"), are commercially available from many manufacturers and retailers. Examples include the Motorola TALKABOUT and the Kenwood FREETALK, but there are many others.

The vehicle accessories of system 100 also include a CB radio 108, a cellular telephone or other wireless communication device 110, a geographic designation device 112 such as a GPS device 112 with an audio output, and a radar detection device 114, also with an audio output.

Each of the vehicle audio accessories outputs an audio signal. This audio signal normally would be communicated to a speaker within the device itself, perhaps after appropriate amplification and signal conditioning. The conditions of these various audio signals may vary from device to device. Examples of such signal conditions might include the volume, noise composition and/or level, whether it is monophonic or stereo, etc.

In accordance with this aspect of the invention, the vehicle audio system further comprises an audio switching device. The audio switching device comprises in input section for receiving the audio signals from the vehicle audio accessories, a switching section operatively coupled to the input section for receiving the audio signals, a controller operatively coupled to the input section for receiving the audio signals and operatively coupled to the switching section for providing control signals to control the switching section and to regulate the output of the audio signals from the switching section according to an instruction set, and an output section operatively coupled to the switching section for receiving the regulated audio signals outputted from the switching section.

Figure 2:
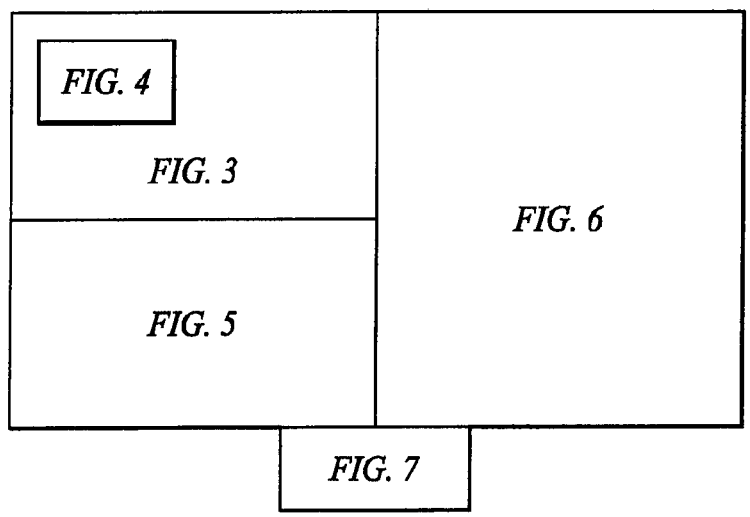
FIG. 2 shows the relationship of FIGS. 3-7.
Figure 4:
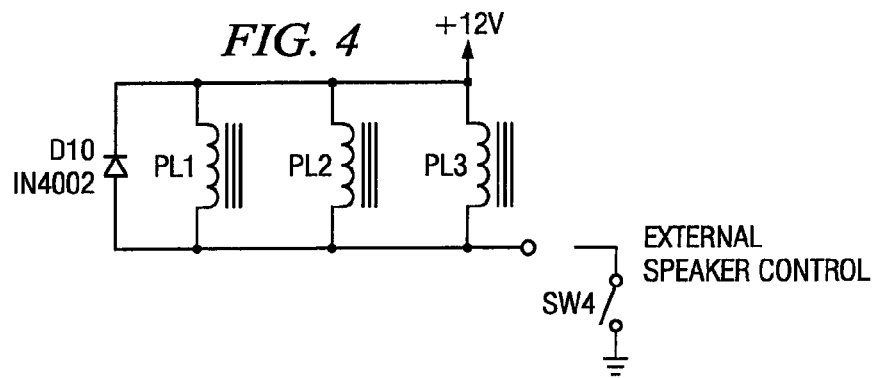
FIG. 4 shows a set of relays that comprise part of the input section for the embodiment of FIG. 1.
Figure 5:
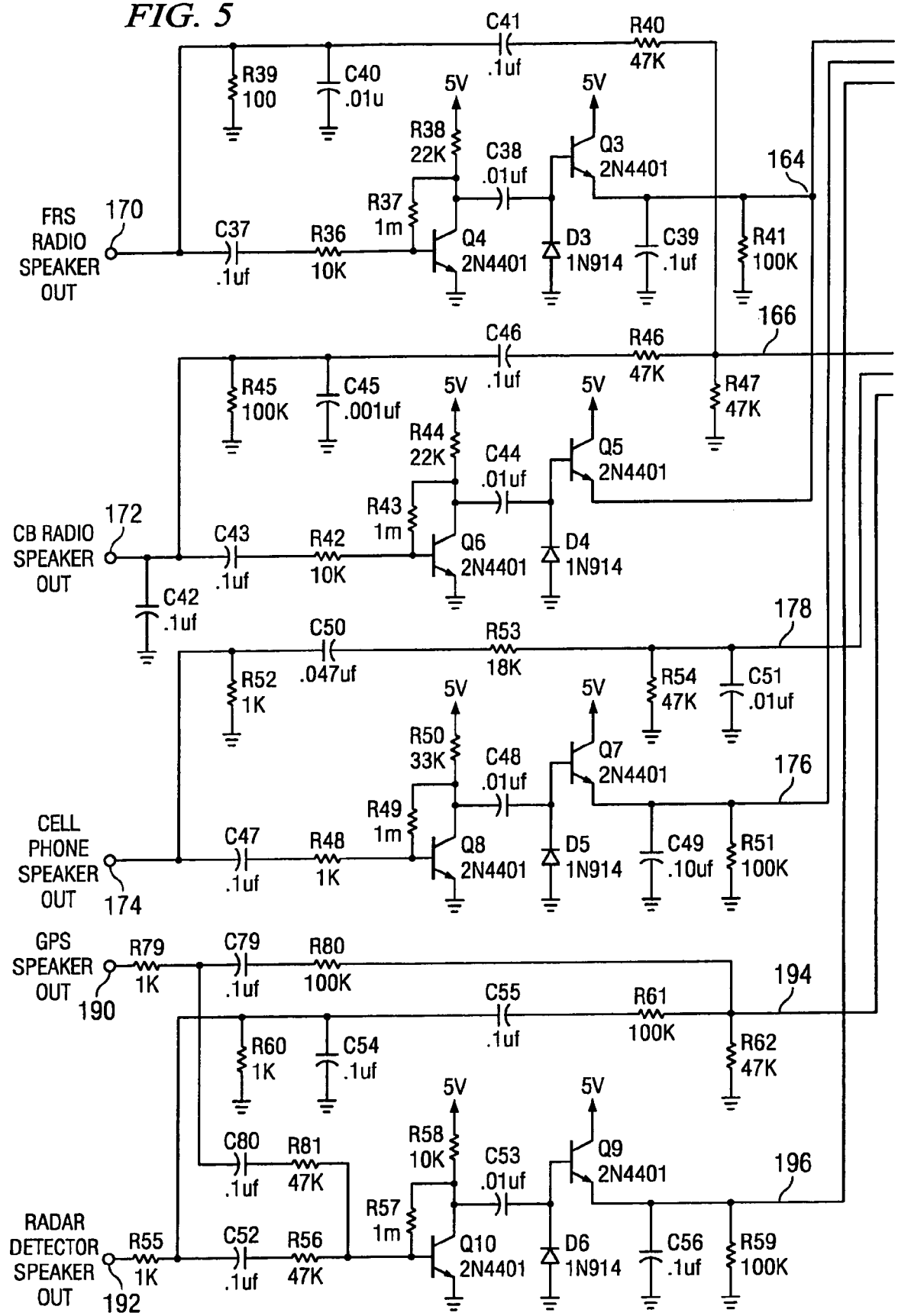
FIG. 5 shows another portion of the input section according to the embodiment of FIG. 1.

As implemented in the presently preferred embodiment, system 100 comprises an audio switching device 120 that in turn comprises an input section 122, a switching section 124, a controller 126, and an output section 128. It also may and preferably does comprise a control panel 130. A schematic diagram of switching device 120 is shown in FIGS. 3-7. The functional layout of these diagrams and figures is shown in FIG. 2. Although limited exceptions apply, the components comprising input section 122 are shown in FIGS. 3-5, the components comprising the switching section 124, controller 126 and output section 128 are shown in FIG. 6. A power supply for the switching device 120 is shown in FIG. 7.

As noted above, input section 122 receives the audio signals from the vehicle audio accessories. In this embodiment, also as noted above, the vehicle accessories comprise a music source 102, a headset microphone 104, a GMCD 106, a CB radio 108, a cell phone 110, a GPS receiver 112, and a radar detector 114. Music source 102 in this embodiment comprises a first level music source, which here includes the stereo system 104a that comes as standard equipment with the motorcycle. Stereo system 104a typically will include will include AM and FM radio, cassette tape player, and/or a CD player. Stereo 104a will have a signal condition and a voltage level that is specified by the manufacturer. Input section 122 is adapted to receive the output from stereo 104. Moreover, in this particular embodiment, it is assumed that headsets are provided for the driver or motorcycle operator and a passenger. Accordingly, in this preferred implementation, input section 122 includes four pairs of leads 140 which comprise the output from stereo 104 to the speakers of either the headsets or any other speakers on motorcycle, such as faring speakers. Four sets of terminals are provided because there are two sets of speakers for the audio system with which the preferred embodiment operates. This supports, for example, two pairs of faring speakers, two in the front and two in the rear. Switches RL1 are provided at terminals 140 for the front set of speakers, and a switch RL2 is provided for the rear speakers. A switch SW4 is provided for external speaker control to isolate the original vehicle's audio system's speaker signal from the speakers.

Terminals 140 are connected to a signal conditioning and low pass filter comprising resistors R3, R4, R5 and R6 and capacitors C5 and C6. In this preferred embodiment, resistors R3 and R4 have values of 33K ohms and resistors R5 and R6 have values of 1K ohms. Capacitors C5 and C6 have values of 0.1 micro farads ("uf"). The outputs of the conditioning and filter circuitry are provided to a switch or relay RL3.

Music source 102 in this embodiment also includes a second level music source, which in this embodiment comprises right and left channel inputs for a portable music source, such as a portable cassette player, portable CD player or MP3 device. Input section 122 accordingly includes leads or terminals 142 for connection to this second level music level source 102b. Terminals 142 respectively are coupled to 680 ohm resistors R1 and R2, and to 0.1 uf capacitors C1 and C2 which function as low pass filters, and on to the terminals of switch RL3. The outputs of the switch RL3 are coupled to respective 1 uf capacitors C3 and C4 and to corresponding and respective 10k ohm resistors R7 and R8, which function as a low pass filter. The outputs are provided as lines 144 and 146, respectively.

The headset accessory 104 in this preferred embodiment comprises a pair of headsets 104a and 104b, each having a microphone. Each headset includes a microphone, which may take any one of a number of designs. In accordance with this preferred embodiment, each of the microphones preferably comprises an AEROMIKE.RTM. microphone as is provided on the J&M headsets noted above, or a tunable microphone designed in accordance with U.S. Pat. No. 5,329,593, issued to Lazzeroni and Carevich. Each microphone has a pair of wires comprising its output, which are coupled to terminals 150 and 152. Each microphone has appropriate signal conditioning and filtering circuitry, for example, including the filters comprising capacitors Cnnn and resistor Rnnn and transistor Qnnn. A 0.001 uf capacitor C7 is coupled across terminals 150, and a 0.001 uf capacitor C8 is coupled across terminals 152. A 10K ohm resistor R9 is coupled to one of the terminals 150, and a 10K ohm resistor R10 is coupled to one of terminals 152. Resistors R9 and R10 are used for impendence matching two microphone preamplifiers together with a 0.001 uf capacitor C9 for rf bypassing. The other of the terminals of 150 and 152 is coupled to ground. The first terminal of terminal sets 150 and 152 are coupled at a junction 154. Junction 154 is coupled to an 8 volt power source from the power supply (FIG. 7) via a filter comprising 10 uf capacitor c10, 330 ohm resistor R11, and 10K resistor R12. Junction 154 also is coupled to an operational amplifier U1-*a* at the negative terminal (terminal 2) of amp U1-*a*, via filtering circuitry comprising 0.001 uf capacitor C11, 22K ohm resistor R13, 0.01 uf capacitor C12, and 1K ohm R14, as configured in FIGS. 3A and 3B. The positive terminal (terminal 3) of op amp U1-*a* receives a 4 volt source from the power supply (FIG. 7) via a filter comprising 100 uf capacitor C13 and 0.1 uf capacitor C14 coupled in parallel to ground. Terminal 4 of op amp U1-*a* also is coupled to the 8 volt power source. Output terminal 1 of op amp U1-*a* is coupled to the input of negative terminal 2 of op amp U1-*a* via 330 pico farad ("pf") and 1 mega ohm ("m") resistor R15 in parallel, and to ground via 1K ohm resistor R16. Output terminal 1 of op amp U1-*a* also is coupled to microphone volume control PTV5KLIN via 0.1 uf capacitor C16. A 470 ohm resistor R78 is coupled across the terminals of the volume control, and filtering circuitry comprising 0.1 uf capacitor C78, 0.0047 uf capacitor C17, and 4.7K ohm resistor R17. Resistor R17 is coupled to a microphone output line 156.

Junction 154 also is coupled to output 2 GMCD 107, CB radio 108, and cell phone 110. In this embodiment, junction 154 is coupled to CB radio 108 via signal conditioning and filtering circuitry comprising 0.1 uf capacitor C33, 2.7K ohm resistor R24, 10K resistor R25, 22K resistor R26, 0.001 uf capacitor C34 (coupled to ground as a low pass filter) and 0.001 uf capacitor C35. A switch RL5 is included to select and deselect CB radio 108.

Junction 154 is coupled to GMCD 106 via signal conditioning and filtering circuitry comprising 0.1 uf capacitor C30, 2.7K resistor R21, 10K resistor R22, and 22K resistor R23. A switch RL4 is provided to selectively connect and disconnect GMCD 106.

Junction 154 is coupled to cell phone 110 via signal conditioning and filtering circuitry comprising 0.001 uf capacitor C27, 220K ohm resistor R18, 0.1 uf capacitor C29, 560K resistor R19, transistor Q1, and 7.5K resistor R20. Transistor Q1 in the illustrative embodiment is a bipolar junction transistor. Junction 154 is coupled to the base via capacitors C27 and C28 and resistor R18. The emitter is coupled to ground and to capacitor C29. The collector is coupled to the base via resistor R19, and to the output terminal 2 cell phone 110.

Figure 3A:
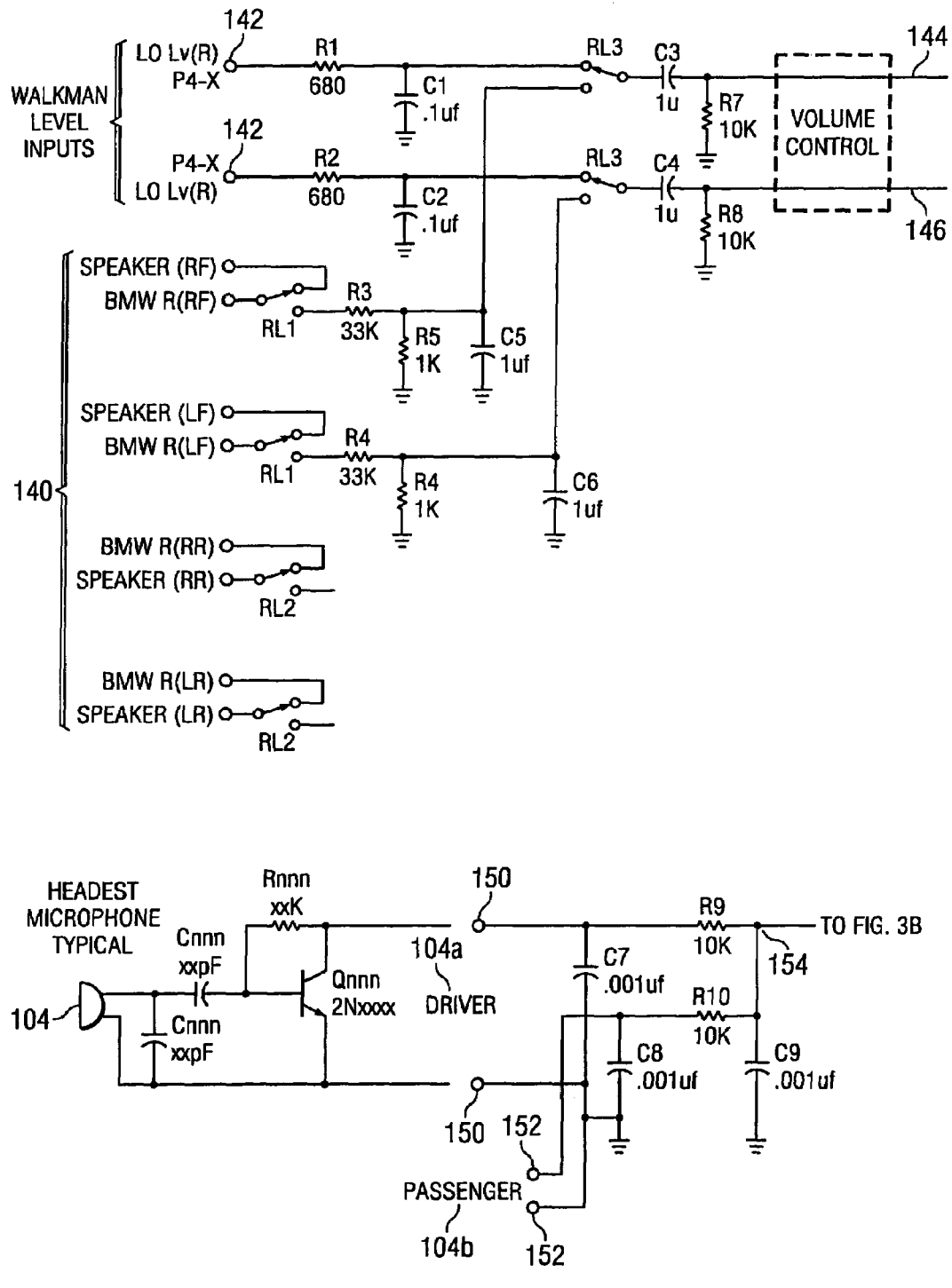
FIGS. 3A and 3B show a portion of the input section according to the presently preferred embodiment of FIG. 1.
Figure 3B:
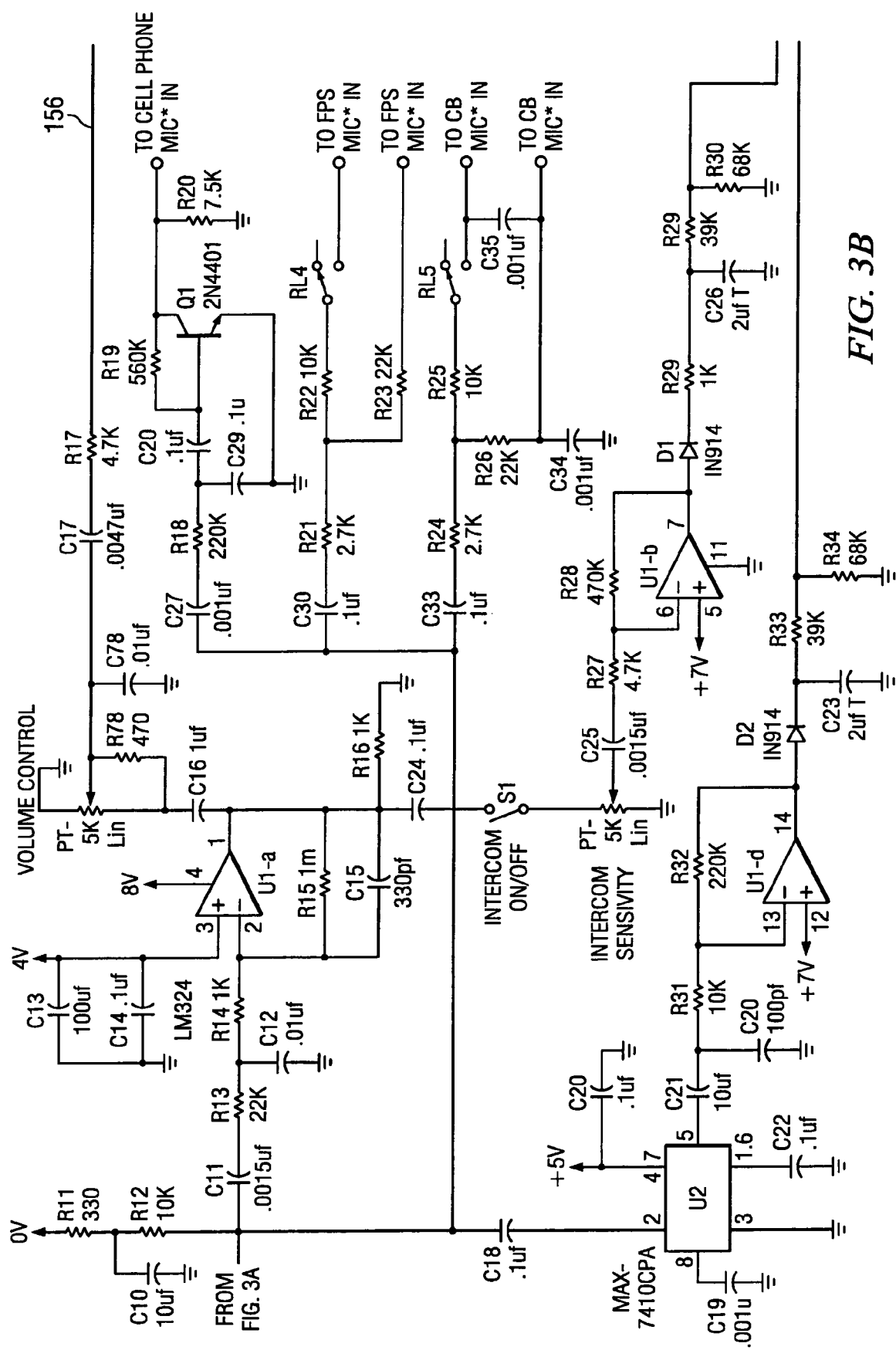

In this embodiment input section 122 includes a voice path for the audio signal of the microphone to be communicated to the controller. With reference to FIGS. 3A and 3B, output terminal 1 of op amp U1-*a* is coupled via 0.1 uf capacitor C24 to intercom on/off switch S1. Switch S1 is coupled to a variable intercom sensitivity control PTS5KLIN and further to the negative terminal (terminal 6) of an op amp U1-*b* via 0.0015 uf capacitor C25 and 47K ohm resistor R27. Negative terminal 6 of op amp U1-*b* is coupled to output terminal 7 of op amp U1-*b* via 470K resistor R28. Positive terminal 5 of op amp U1-*b* is coupled to a 7volt power source from the power supply (FIG. 7). Terminal 11 of op amp U1-*b* is coupled to ground. The output terminal 7 of op amp U1-*b* is coupled to diode D1, 1K ohm resistor R79, and 39K resistor R29 to a microphone voice pack signal point 160. A 2 uf capacitor C26 is coupled between resistors R79 and R29 and to ground. 68K resistor R30 is coupled between resistor R29 and point 160 and is coupled to ground.

Input circuit 122 further includes a low pass filter for the microphone audio signals. Junction 154 is coupled via a 0.1 uf capacitor C18 to a low pass filter, which in this embodiment comprises a low pass filter chip U2, and specifically at pin 2 of filter chip U2 pins 4 and 7 of filter chip U2 is coupled to +5 volt power source from the power supply (FIG. 7), and to a low pass filter in the form of a 0.1 uf capacitor C20. Pin 3 of filter chip U2 is coupled to ground, and pin 8 is coupled to ground via 0.001 uf capacitor C19 setting the filters rool off point. Pins 1 and 6 of chip U2 are coupled to ground via 0.1 uf capacitor C22. Pin 5 of chip U2 is coupled to negative terminal 13 of op amp U1-*d* via a filter comprising 10 uf capacitor C21, 100 pf capacitor C20 and 10K resistor R31. Positive terminal 12 of op amp U1-*d* is coupled to the 0.7 volt power source via the power supply (FIG. 7). Output terminal 14 of op amp U1-*d* is coupled to negative terminal 13 via a 220K resistor R32. Output terminal 14 of op amp U1-*d* also is coupled to a diode D2 and signal conditioning and circuitry comprising 2 uf capacitor C23, 39K resistor R33, and 68K resistor R34 to a low pass filter signal point 162.

Turning to FIG. 5, GMCD 106 is coupled to a terminal 170 of input section 122. Terminal 170 in turn is coupled to signal conditioning and filtering circuitry that comprises 0.1 uf capacitor C37, 10K resistor R36, 1 m resistor R37, 22K resistor R38, transistor Q4, 0.01 uf capacitor C38, diode D3, transistor Q3, 1 uf capacitor C39, and 100K resistor R41. Transistors Q3 and Q4 in this preferred embodiment comprises an NPN bipolar junction transistor. The emitter of transistor Q4 is coupled to ground. The base of transistor Q4 is coupled to terminal 170 via capacitor C37 and resistor R36 in series. The collector of transistor Q4 is coupled to its base via resistor R37 and to a 5 volt power source from the power supply (FIG. 7) via resistor R38. The base of transistor Q3 is coupled to the collector of transistor Q4 via capacitor C38, and to ground via diode D3. The collector of transistor Q3 is coupled to a 5 volt power source from the power supply (FIG. 7). The emitter of transistor Q3 is coupled to a signal point 164 via a filter comprising 1 uf capacitor C39 and 100K resistor R41 coupled to ground in parallel.

CB radio 108 has an output coupled to input terminal 172 of input section 122. Terminal 172 is coupled to signal conditioning and filtering circuitry comprising 0.1 uf capacitor C42, 0.1 uf capacitor C43, and 10K resistor R42. A transistor Q6 (identical to transistors Q3 and Q4) is coupled at its base to terminal 172 via capacitor C43 and R42. The emitter of transistor Q6 is coupled to ground. The collector of transistor Q6 is coupled to its base via 1 M resistor R43. The collector of transistor Q6 also is coupled to a 5 volt power source from the power supply (FIG. 7) via 22 K resistor R44. A transistor Q5 (identical to transistor Q6) is coupled at its base to the transistor of Q6 via a 0.01 uf capacitor C44. The base of transistor Q5 is also coupled to ground via diode D4, which is identical to diode D3. The collector of transistor Q5 is coupled to a 5 volt power source from the power supply (FIG. 7). The emitter of transistor Q5 is coupled to GMCD/CB signal point 164.

Input section 122 also includes circuitry for providing the audio signals directly from GMCD106 and CB108, which in this embodiment comprises the following. Terminal 170 is coupled to point 166 via signal conditioning and filtering circuitry comprising 100 ohm resistor R39 (coupled to ground), 0.01 uf capacitor C40 (also coupled to ground), and 1 uf capacitor C41 and 47K resistor R40 coupled in series. Similarly, terminal 172 is coupled to point 166 via identical circuitry but comprising resistor R45, capacitor C45, capacitor C46, and resistor R46, respectively. Both resistors R40 and R46 are coupled to a 47K resistor R47 that in turn is coupled to ground. Point 166 thus corresponds to the combined audio signals from GMCD 170 and CB radio 108.

Input section 122 further includes a terminal 174 coupled to the output of cell phone 110 to receive the audio output signal from the cell phone. Terminal 174 is coupled to the base of a transistor Q8 (identical to transistors Q3-Q6) via filtering circuitry comprising 0.1 uf capacitor C47 and 1K resistor R48. The emitter of transistor Q8 is coupled to ground. The collector of transistor Q8 is coupled to its base via 1 m R49. The collector of transistor Q8 also is connected to a 5 volt power source from the power supply (FIG. 7) via a 33K resistor R50. A transistor Q7 (identical to transistor Q8) is coupled at its base to collector of transistor Q8 via a 0.01 uf capacitor C48. The base of transistor Q7 also is coupled to ground via a diode D5 identical to diodes D3 and D4. The collector of transistor Q7 is coupled to a 5 volt power source from the power supply. The emitter of transistor Q7 is coupled to filtering circuitry comprising 10 uf capacitor C49 and 100K resistor 100 coupled in parallel to ground. The emitter of transistor Q7 also is coupled to and comprises a cell phone control signal point 176.

Terminal 174 also is coupled to a cell phone audio signal point 178 via signal conditioning and filtering circuitry comprising 1K resistor R52, 0.047 uf capacitor C50, 18K resistor R53, 47K resistor R54, and 0.01 uf capacitor C51. Resistors R52 and R54 and capacitor C51 are coupled to ground, and capacitor C50 and resistor 53 are in series with terminal 174 and point 178.

Input section 122 further includes a transistor 190 for receiving the output of GPS 112. In this preferred but merely illustrative embodiment, the signals from the GPS and from the radar detector are combined. Accordingly, input section 122 also includes a terminal 192 for receiving the audio output of radar detector 114. GPS terminal 190 is coupled to a GPS/radar audio signal point 194 via signal conditioning and filtering circuitry that comprises a 1K resistor R79, a 0.1 uf capacitor C70, and a 100K resistor R80. A 47K resistor R62 is connected between resistor R80 and point 194, and is coupled to ground. Radar detector terminal 192 is coupled to point 192 via a 1K resistor R55 and filtering circuitry that comprises a 1K resistor R60, a 0.1 uf capacitor C54, a 0.1 uf capacitor C55, and a 100K resistor R61. Resistor R60 and capacitor C54 are coupled to ground, and capacitor C55 and resistor R61 are in series. A 47K resistor R62 is coupled between resistor R61 and point 194, and is coupled to ground.

Input section 122 also comprises a GPS/radar detector control signal path. GPS terminal 190 is coupled via resistor R79, and via a 0.1 uf capacitor C80 and a 47K resistor R81, to the base of a transistor Q10 (identical to transistors Q3-Q8). Similarly, radar detector terminal 192 is connected to the base of transistor Q10 via resistor R55, and via a 0.1 uf capacitor C52 and a 47K resistor R56. The emitter of transistor Q10 is coupled to ground. The collector of transistor Q10 is coupled to its base via a 1 m resistor R57. The collector of transistor Q10 also is coupled to a 5 volt power source from the power supply via a 10K resistor R58. The collector of transistor Q10 also is coupled via a 0.01 uf capacitor to the base of a transistor Q9 (identical to transistor Q10). The base of transistor Q9 is coupled to ground via a diode D6 identical to diodes D3-D5. The collector of transistor Q9 is coupled to a 5 volt power source from the power supply. The emitter of transistor Q9 is coupled to a GPS/radar detector control signal point 196.

Figure 6A:
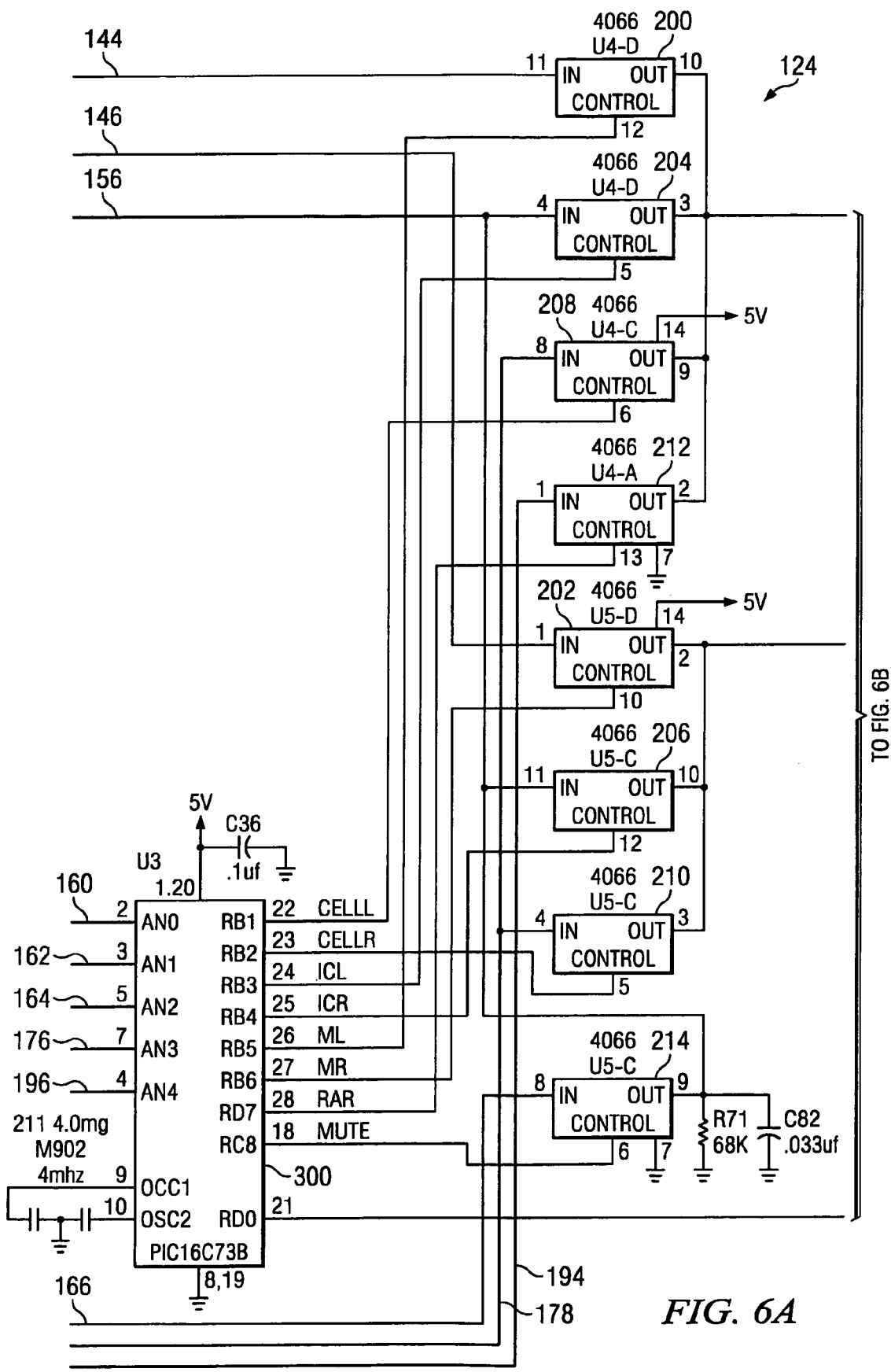
FIGS. 6A and 6B show the switching and output sections of the embodiment shown in FIG. 1.
Figure 6B:
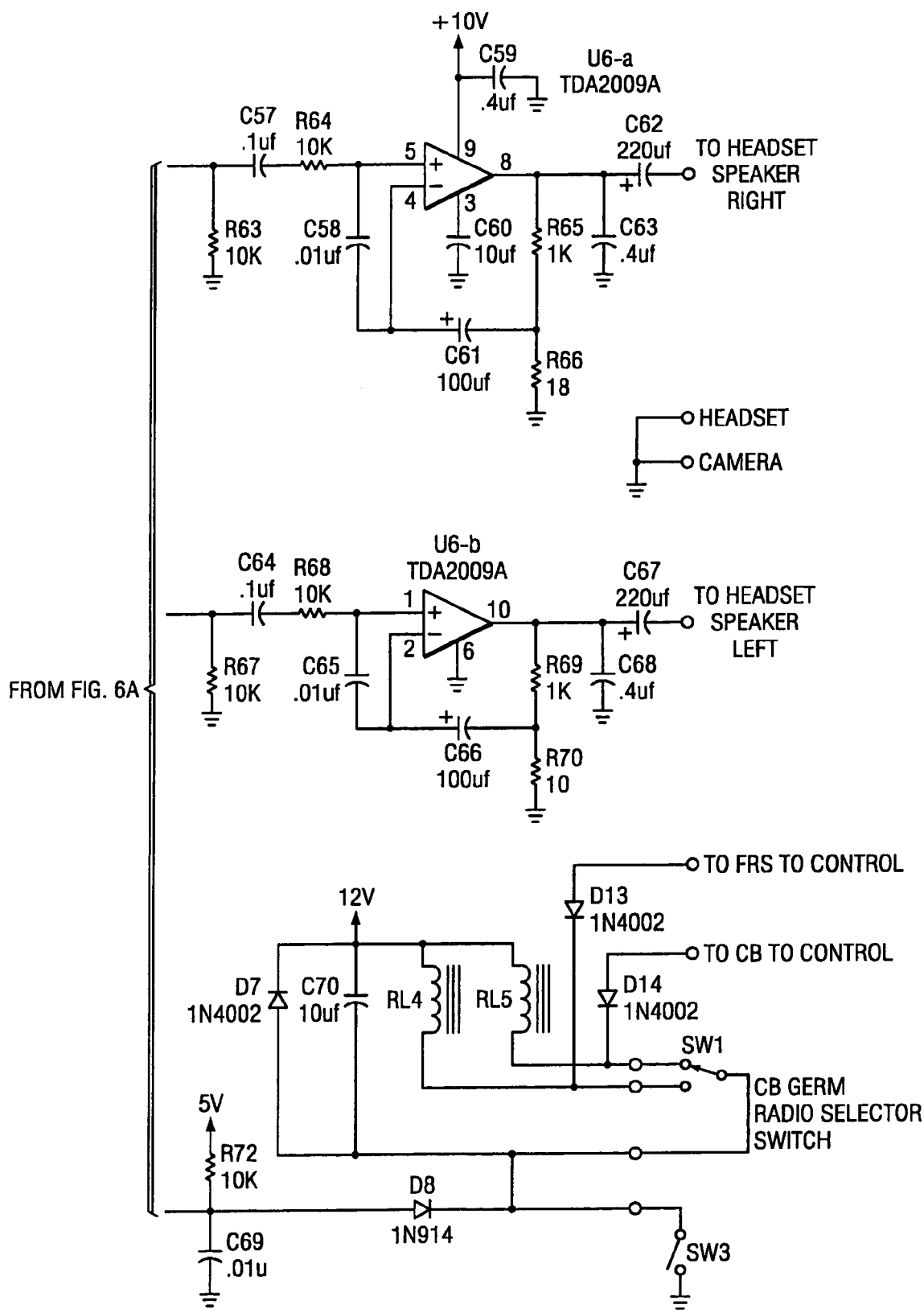
Figures 7, 8:
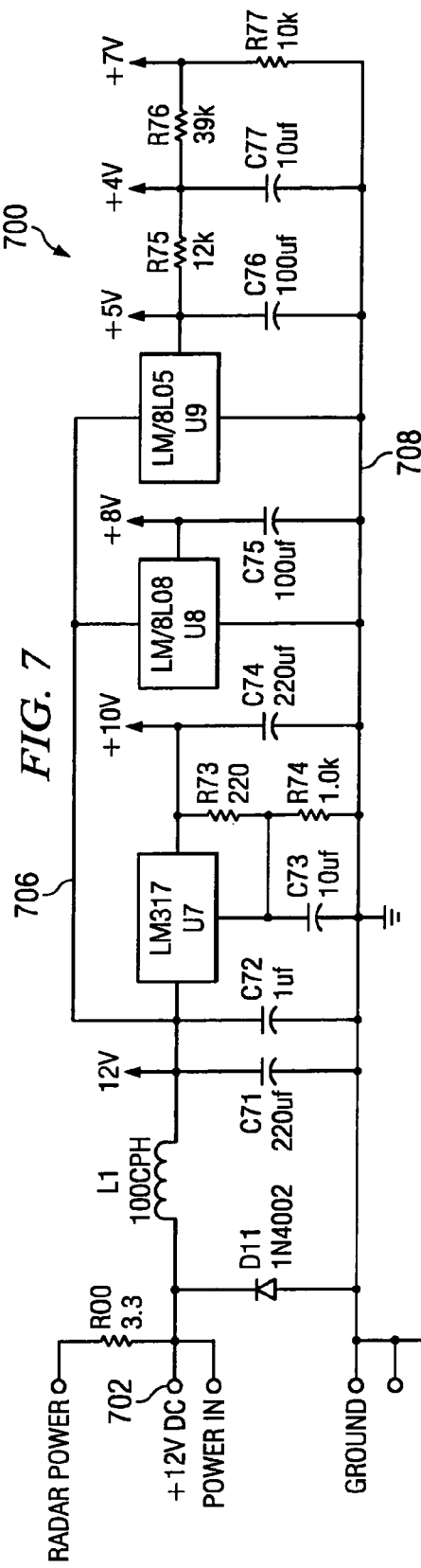
FIG. 7 shows the power supply circuitry for the embodiment of FIG. 1.
FIG. 8 is a flow diagram of programming or instructions that reside in the controller of the embodiment of FIG. 1, and the processing steps that occur according to those instructions.

Components comprising switching section 124 are shown in FIGS. 6A and 6B. In the preferred embodiment, switching section 124 of system 100 comprises 8 analog switches. In this specific embodiment, the switches comprise two quad switching devises.

As shown in FIGS. 6A and 6B, switching section 124 specifically comprises a right music channel switch 200, a left music channel switch 202, a right channel microphone switch 204, a left channel microphone switch 206, a right channel cell switch 208, a left channel cell switch 210, a GPS/radar switch 212, and a GMCD/CB switch 214. Switches 200, 204, 208 and 212 comprise a right channel bank of switches. Switches 202, 206 and 210 comprise a left channel bank of switches.

Controller 126 according to this presently preferred embodiment comprises a controller chip, preferably capable of following an instruction set regarding the manner in which the control signals inputted into the chip cause switching to occur in the switching section 124. Controller 300 preferably is a programmable device that can be programmed to conduct this switching according to predetermined criteria, timing relationships, voltage levels or voltage difference levels, etc. As implemented in system 100, controller 300 comprises a Model PIC16C73B-04/SP chip, commercially available from Microchip Technologies, Inc. of Phoenix, Ariz. Controller 300 is coupled at pin 2 to microphone voice path control signal point 160, and thus receives the microphone voice path control signal at pin 2. Chip 300 is coupled at pin 3 to low pass filter signal point 162, and thus receives the low pass filter signal from microphones 104a and 104b at pin 3. Controller 300 is coupled at pin 5 to GMCD/CB control signal point 164, and thus receives the GMCD/CB control signal at pin 3. Controller 300 is coupled at pin 7 to cell phone control signal point 176, and thus receives the cell phone control signal at pin 7. Controller 300 at pin 4 is coupled to GPS/radar detector control signal point 196, and thus receives the GPS/radar detector control signal at pin 4. Pins 9 and 10 are coupled to one another and comprise an oscillator operating at about 4 MHZ. Pins 1 and 20 of controller 300 are coupled to a 5 volt power source from the power supply (FIG. 7) via a low pass filter comprising a 0.1 uf capacitor C36. Pins 8 and 19 of controller 300 are coupled to ground.

The outputs of controller 300 are as follows. Pin 22 is coupled to the gate of right channel cell phone switch 208. Pin 23 is coupled to the gate of left channel cell phone switch 210. Pin 24 is coupled to the gate of right channel microphone switch 204. Pin 25 is coupled to the gate of left channel microphone switch 206. Pin 26 is coupled to the gate of right channel music switch 200. Pin 27 is coupled to the gate of left channel music switch 202. Pin 28 is coupled to the gate of GPS/radar switch 212. Pin 18 of controller 300 is coupled to the gate of DMCD/CB switch 214.

Output section is operatively coupled to switching section 124 for receiving the regulated audio signals outputted from switching section 124, as regulated by controller 300. The output of right channel switches 200, 204, 208 and 212 are coupled to one another. They also are coupled to a power amplifier U6-a. More specifically, the outputs of these right channel switches are coupled to the positive terminal, (terminal 5) of amplifier U6-a via filtering circuitry comprising 10K resistor R63, 0.1 uf capacitor C57, and 10K resistor R64. Capacitor C57 and resistor R64 are in series, and resistor R63 is coupled to ground. The negative terminal (terminal 4) of power amp U6-a is coupled to the output of the right channel switches via the filter (R63, C57 and R64), and via a 0.01 uf capacitor C58. Capacitor C58 is connected across terminals 4 and 5 of power amp U6-a. The outputs of the right channel switches also are coupled to terminal 3 of power amp U6-a via the filter (R63, C57, and R64), capacitor C58 and a 10 uf capacitor C60. The output of the right channel switches also is provided to the output terminal (terminal 8) of power amp U6-a via the filter (R63, C57 and R64), capacitor C58, a 100 uf capacitor C61, and 1K resistor R65. An 18 ohm resistor is connected between capacitor C61 and resistor R65. Output terminal 8 of power amp U6-a also is connected to the right headset speaker of headsets 104a and 104b via filtering circuitry that comprises a low pass filter in the form of a 220 uf capacitor C62 and a high pass filter in the form of a 0.4 uf capacitor C63.

The output of left channel switches 202, 206 and 210 also are coupled to one another. They are coupled to a left channel amplifier U6-b via a filtering circuit that comprises a 10K resistor R67, a 0.1 uf capacitor C64, and a 10K resistor R68. This filter is coupled to the positive terminal (terminal 1) of power amp U6-b. Capacitor C64 and resistor R68 are in series, and resistor R67, which is coupled between the left channel switch outputs and capacitor C64, is coupled to ground. The negative terminal (terminal 2) of power amp U6-b is coupled to the outputs of the left channel switches via the filter (R67, C64 and R68), and via a 0.01 uf capacitor C65. Terminals 1 and 2 of power amp U6-b are coupled to one another via capacitor C65. The outputs of the left channel switches also are coupled to the output terminal (terminal 10) of op amp U6-b via the filter (R67, C64 and R68), capacitor C65, a 100 uf capacitor C66, and a 1K resistor R69. An ohm resistor R70 is coupled between capacitor C66 and resistor R69. Output terminal 10 of power amp U6-b also is coupled to the left speaker of headsets 104a and 104b via a filtering circuit comprising a 220 uf capacitor C67 in series and a 0.4 uf capacitor C68 that is coupled to ground.

The audio signal from GMCD/CB is provided to both the right and left channel speakers of headsets 104a and 104b. Accordingly, the output of GMCD/CB switch 214 is coupled, via a filtering circuit comprising a 68 resistor R71 and a 0.033 uf capacitor C82, both coupled to ground, to the inputs of right microphone channel switch 204 and left microphone channel switch 206.

Pin 21 of controller 300 is coupled to a switch SW1 for selecting between the GMCD and the CB radio in the following manner. Pin 21 of controller 300 is coupled to a 5 volt power source from the power supply (FIG. 7) via a 10K resistor R72. A 0.1 uf capacitor C69 provides filtering. Pin 21 of controller 300 also is coupled to a diode D8 identical diodes D3-D6. The output of the diode is coupled to a switching circuit that includes relays RL4 and RL5. RL4 is coupled to the GMCD, and RL5 is coupled to the CB radio. Relays RL4 and RL5 are in parallel with a 10 uf capacitor C70 and a diode D7. A 12 volt power source from the power supply (FIG. 7) is coupled to the relays to energize them. The output of relay 4 is coupled via a diode to the control terminal of GMCD 106. The output of relay RL5 is outputted via a diode to a control terminal of CB radio 108. Accordingly, switch SW1 provides a means to select between these two devices using relays RL4 and RL5. See FIGS. 3A and 3B.

Pin 21 of controller 300 also is coupled to a switch SW2. Switch SW2 also is coupled to ground. Switch SW2 provides a path to ground for those radio designs that require that level to initiate the transmit mode.

The power supply 700 used to provide power to switching device 120 as shown in FIG. 7. Power supply 700 receives as an input a +12 volt DC power source at terminal 702. A ground terminal 704 is provided. Terminal 702 is coupled to a rail 706, and ground terminal 704 is coupled to a ground rail 708. Rail 706 includes an inductor L1 having a value of 1000 milli Henry (mH). A diode is coupled between terminal 702 and inductor L1 on rail 706, and the other electrode of diode D11 is coupled to ground rail 708. A 220 uf capacitor C71 is coupled to a terminal of inductor L1 at rail 706, and to rail 708. A 12 volt tap is provided between inductor L1 and capacitor C71. A voltage regulator U7 is coupled between inductor L1 and capacitor C71. A 0.1 uf capacitor C72 is coupled between one terminal of regulator U7 and ground rail 708. Another terminal of regulator U7 is coupled to a 10 uf capacitor C73 which in turn is coupled to ground rail 708. A third terminal of regulator U7 is coupled to a 220 ohm resistor R73 and to a 220 uf capacitor C74. A +10 volt voltage tap is connected between resistor R73 and capacitor C74. Capacitor C74 also is coupled to ground rail 708. A 1.5K ohm resistor R74 is coupled to resistor R73, and the second terminal of regulator U7 is coupled between resistors R73 and R74.

An 8 volt voltage regulator U8 also is coupled to rail 706. A second terminal of regulator U8 is coupled to ground rail 708. A third terminal of regulator U8 is coupled to a 100 uf capacitor C75, that in turn is coupled to ground rail 708. A +8 volt tap is provided between the third terminal of regulator U8 and capacitor C75.

A 5 volt voltage regulator U9 also is coupled to rail 706. A second terminal of regulator U9 is coupled to ground rail U8. A third terminal of regulator U9 is coupled to a 100 uf capacitor C76 and a 12K resistor R75. A 5 volt tap is provided between terminal 3 of regulator U9 and capacitor C76 and resistor R75. Resistor R75 is coupled to a 39K resistor R76 and a 10 uf capacitor C77. A 4 volt voltage tap is provided between resistors R75 and R76. Resistor R76 is coupled to a 10K ohm resistor R77. A. +7 volt tap is provided between resistor R76 and resistor 77.

In accordance with this and a related aspect of the invention, a method is provided for switching signals in a multi-accessory vehicle audio system having a plurality of vehicle audio accessories. The vehicle audio accessories generate a corresponding plurality of audio signals.

The preferred implementation of this method will be described in conjunction with the multi-accessory vehicle audio system and the audio switching device as heretofore described. It should be appreciated, however, that the method according to this aspect of the invention is not necessarily limited to the specific embodiment, or to the specific hardware or software components described herein and shown in the drawings.

The method according to this aspect of the invention comprises inputting the audio signals into a switching section. In its preferred implementation, this aspect of the method comprises inputting audio signals from accessory 102, 104, 106, 108, 110, 112, and 114 into input section 122, and inputting microphone voice audio signal 156, GMCD/CB audio signal at point 166, the cell phone audio signal at point 178, and the GPS/radar detector audio signal at 194, to analog switches 124 as shown in FIGS. 3, 5 and 6. The method further includes inputting the audio signals into a controller operatively coupled to the switching section and providing control signals from the controller to the switching section to control the switching section and to regulate the output of the audio signals from the switching section according to an instruction set. In the preferred implementation, this comprises inputting microphone voice path control signal 160, low pass filter control signal 162, the GMCD/CB control signal at point 164, the cell phone control signal at point 176, and the GPS/radar control signal at point 196, to controller 300, as shown in FIGS. 3, 5 and 6.

The method according to this aspect of the invention further comprises outputting the audio signals from the switching section. As implemented in the preferred version of the method, this comprises using controller 300 to selectively activate the switches of switching section 124 to selectively cause the desired audio signals to be outputted to the right and left speakers via operational amplifiers U6-a and U6-b, respectively.

The programming and instructions for operation of controller 300, and the processing that is performed by controller 300, are illustrated in FIGS. 8-11. The instructions comprise a number of constants, which are as follows:

Constants:
NOISE_BASE=0.05V
NOISE_OFFSET=0.3V
RADIO_LO=2V
RADIO_HI=3V
CELL_LO=1V
CELL_HI=1.2V
RADAR_LO=2V
RADAR_I=3V
POWER_DELAY=1S
INTERCOM_DELAY=3.5S
NOISE_DELAY=4S
RADIO_DELAY=2.5S
CELL_DELAY=3.5S
PTT_ONDELAY=1 mS
PTT_OFFDELAY=0.1S FIG. 8 shows the top level flow for processing within controller 300. When the system is powered up, a delay is imposed on controller 300 to allow the system to reach steady state and to reduce transcient startup noise. The timer is loaded, and counts down a noise delay. Controller 300 then enters into a loop that is repeated every 25 ms.

System 100 includes a "push-to-talk" or switch SW2, e.g., mounted on the handlebars, that allows the user to speak via the microphone or microphones of the headsets into the radios or cell phone. PTT switch SW2 is coupled to pin 21 of controller 300. When switch SW2 is actuated, it takes priority over other devices. Accordingly, the processing flow tests for the presence of switch SW2, i.e., it conducts a PTT test.

Figure 9:
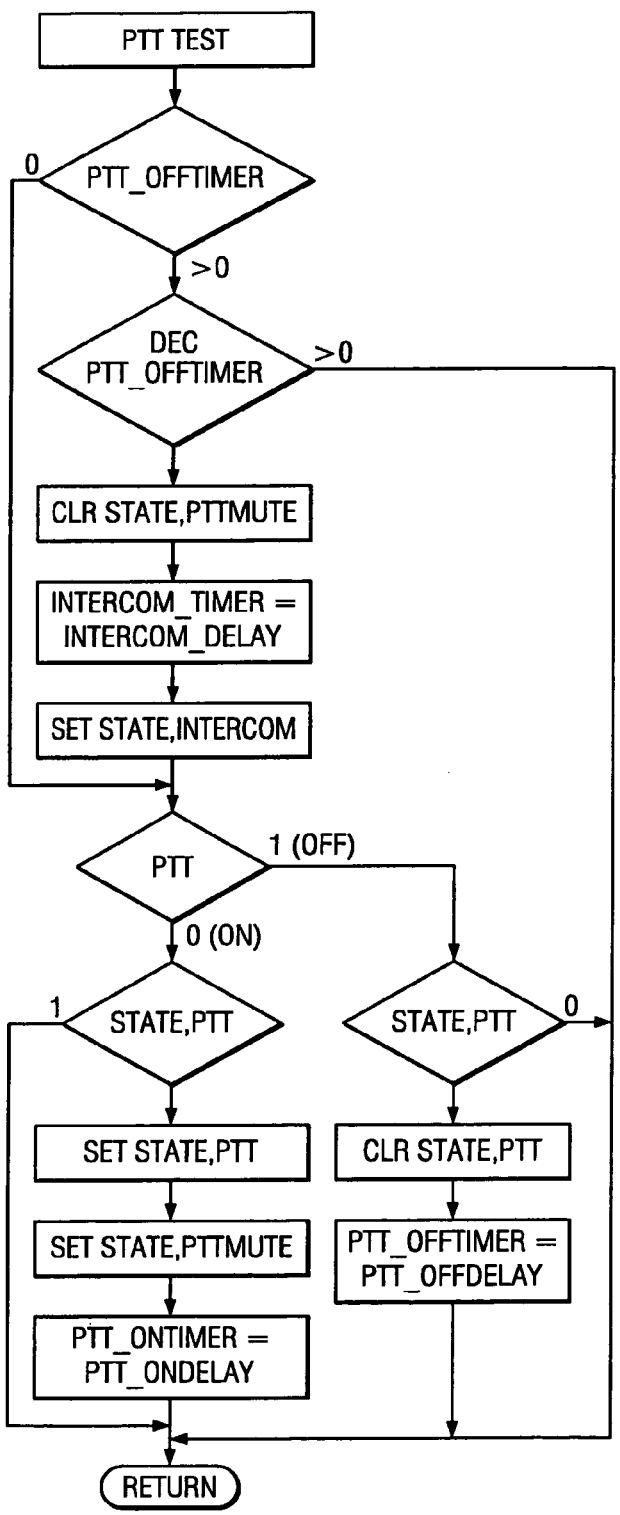
FIG. 9 shows the push-to-talk ("PTT") test performed by the controller.

Processing for the PTT test is shown in FIG. 9. A timing delay, e.g., 1 ms, is introduced before the state of PTT switch SW2 is sampled. The PTT mute is set, and a PTT_OFF-TIMER and a PTT_OFFTIMER variable is decremented until it is 0. The intercom is similarly delayed.

The state of switch SW2, on or off, is recorded by the STATE.PTT variable, which may assume a 0 or a 1. If PTT switch SW2 is off, the STATE.PTT variable is set to 0 and the PTT_TIMER is reset for the delay. If PTT switch SW2 is on, the STATE.PTT variable is set to 1, the PTT_MUTE is set to go on, and the PTT_ONTIMER variable is set to the PTT_ONTIME delay value. The PTT_MUTE provides desired electrical isolation to inhibit noise effect.

Figure 10B:
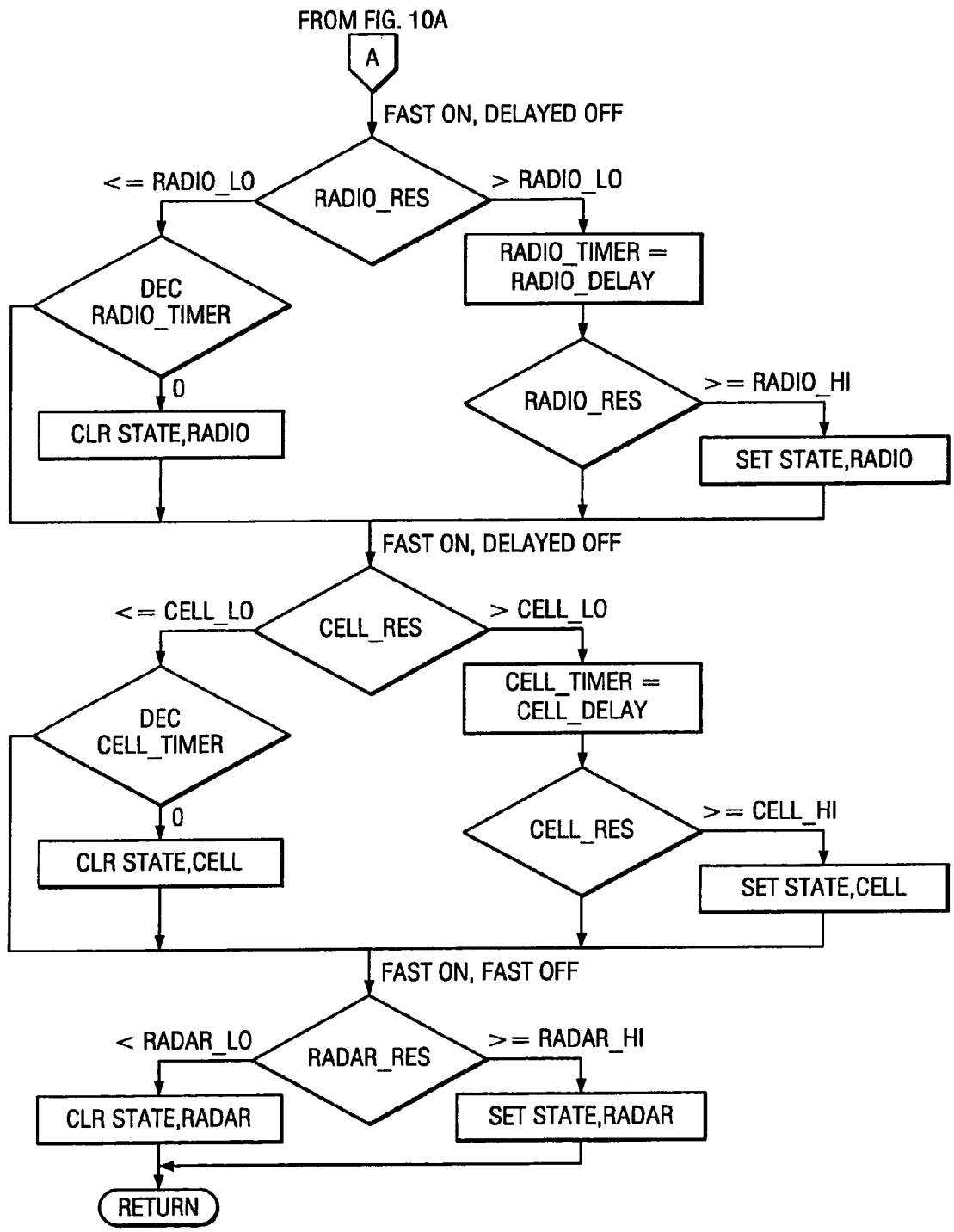

Process A is used when the PTT switch SW2 is in the off position. The processing flows for Process A are shown in FIGS. 10A and 10B. This processing comprises an analog to digital conversion of the audio signal inputs, preferably in parallel, and it introduces delays to avoid unwanted feedback or interference effect. Variables identified in FIGS. 10A and 10B ending with "RES" refer to the result for that variable of the analog to digital conversion.

A NOISE_TIMER is used for the intercom to avoid noise from startup transcience. The intercom is fast on, slow or delayed off. This means that it is to be actuated or turned on quickly when it is used, but there is a delay in turning it off. This helps to avoid the voice signal in the intercom from being cut off or terminated abruptly. If INTERCOM_RES is below the noise level, the INTERCOM_TIMER variable is decremented. When it reaches 0, the STATE.INTERCOM variable is cleared. If INTERCOM_RES is above the noise level, the delay timer is maintained. If the INTERCOM_RES value is greater than the intercom noise level, including the input from the low pass filter, the STATE.INTERCOM variable is set.

The same type of processing is carried out for the GMCD/CB radios, the cell phone and the radar, as shown in the lower part of FIGS. 10A and 10B.

Figure 11:
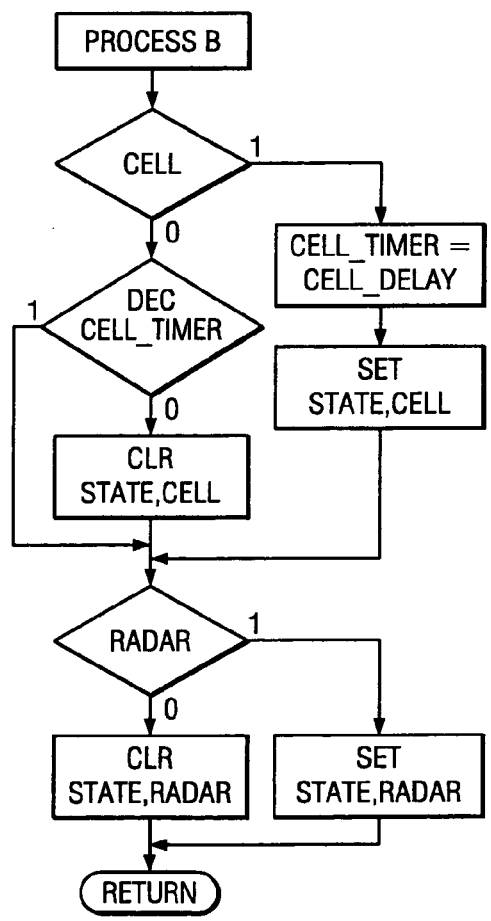
FIG. 11 shows the Process B as reflected in FIG. 8.

Process B is carried out when PTT switch SW2 is in the on position. Processing flows for Process B are shown in FIG. 11. The level of the cell phone is checked. If low, the CELL_TIMER is decremented. When 0, the STATE.CELL variable is cleared. If high, the CELL_TIMER variable is set for the delay and the STATE.CELL variable is set.

The radar detector is processed in similar manner, but without the delays. The manner of processing for other accessories that are to use the PTT switch are essentially the same. If the GMCD or the CB radio uses the PTT feature, they would be processed in the same manner as the cell phone.

Figure 12:
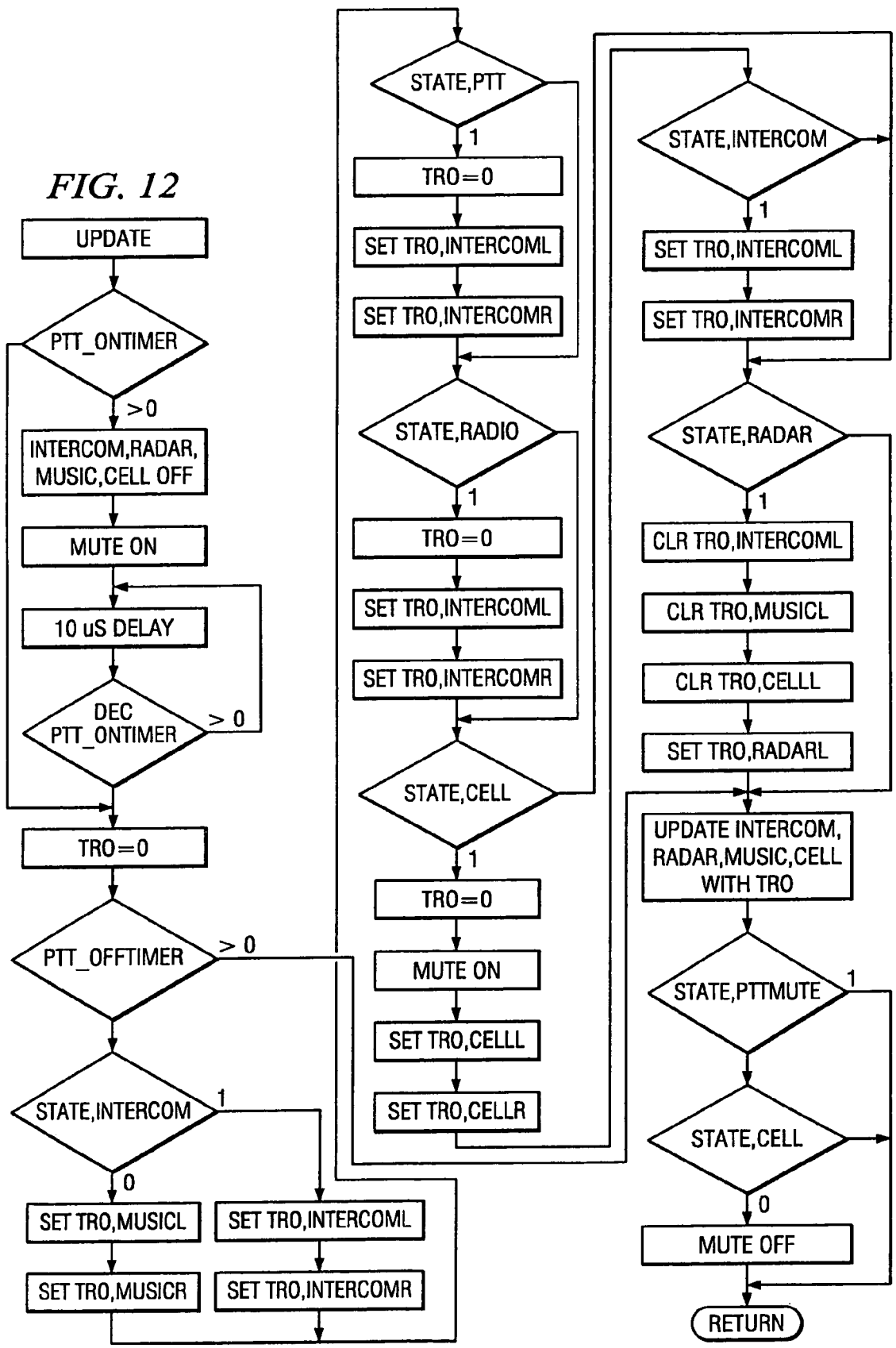
FIG. 12 shows the update processing that is reflected in FIG. 8.

The changes in the state for the various audio accessory signals are used to update the status of controller 300, i.e., to regulate the output of control signals to the switch gates, using the processing flows shown in FIG. 12. The priorities for the various accessories are controlled by the ordering of the flows, and by the overrides as shown in FIG. 12.

To avoid unwanted noise and transcience, a delay, here 10 ms, is introduced, during which the signals from the accessories are turned off and the mute is turned on.

An 8-bit temporary register TRO is used for the update. Each accessory signal corresponds to one bit of the TRO register. It should be noted that a larger temporary register could be used, in which case more accessories could be accommodated.

If the PTT_TIMER is non-0, the TRO register remains unchanged. If the PTT_TIMER is at 0, the STATE variable for each of the accessory signals is loaded into TRO in the appropriate location. If the intercom is at activated, its state is used instead of the music signal. An R at the end of variable denotes right channel, and an L denotes left channel. The cell phone is temporarily muted as part of processing. If the intercom is actuated, its state is recorded instead of the cell state. The radar detector signal in this embodiment is provided only to the left channel of output. Moreover, it overrides all other accessories.

If the state of the PTT_MUTE is on, processing returns to FIG. 8. Otherwise the state of the cell phone signal is checked. If it is off, the MUTE is turned off. Processing then returns to FIG. 8 and the signal states are updated. The processing of FIG. 8 and its subsidiary flows are repeated every 25 ms while the system is in operation.

Additional advantages and modifications will readily occur to those skilled in the art. For example, the input section in the illustrated embodiment includes various components for conditioning the audio signals, but these may be omitted, or other components may be used instead or in addition to the ones shown. The same applies for the output section. Also, the preferred embodiments and methods have been described using entirely electrical components, but it is possible to substitute such components with optical components. Therefore, the invention in its broader aspects is not limited to the specific details, representative devices and methods, and illustrative examples shown and described. Accordingly, departures may be made from such details without departing from the spirit or scope of the general inventive concept as defined by the appended claims and their equivalents.

What is claimed is:

1. A multi-accessory motorcycle audio system comprising: a plurality of audio accessories including a music source: a cellular telephone, a radar detection device, a microphone, and a geographic designation system; and an audio switching device comprising: an input section comprising a microphone audio signal path and a low pass filter signal path, the low pass filter having a low pass filter output, and interconnected with said plurality of audio accessories;

a switching section interconnected with said input section;

a programmable controller comprising an instruction set comprising an instruction for comparing a microphone audio signal with said low pass filter output to obtain a voltage difference signal and an instruction for controlling the switching section in response to the voltage difference signal, and interconnected with said input section and with said switching section and adapted to receive a plurality of audio signals from the input section, and to produce control signals based upon said instruction set;

wherein said switching section is adapted to receive the plurality of audio signals from the input section, to receive the control signals produced by the controller, and to produce an output section interconnected with said switching section.

2. A multi-accessory motorcycle audio system as recited in claim 1, wherein the audio accessories comprise a first level music source and a second level music source.

3. A multi-accessory motorcycle audio system as recited in claim 1, wherein said microphone comprises a headset microphone.

4. A multi-accessory motorcycle system as recited in claim 1, wherein the audio accessories comprise a pair of headset microphones.

5. A multi-accessory motorcycle audio system as recited in claim 1, wherein the audio accessories comprise a wireless communications device.

6. A multi-accessory motorcycle audio system as recited in claim 1, wherein the audio accessories comprise a general mobile communications device.

7. A multi-accessory motorcycle audio system as recited in claim 1, wherein: the audio accessories comprise a first level music source and a second level music source; and the input section comprises a switch for switching between the first and second music sources.

8. A multi-accessory motorcycle audio system as recited in claim 1, wherein: the audio accessories comprise a general mobile communications device having a general mobile communications device audio signal and a citizen's band radio having a citizen's band radio audio signal; and the input section includes coupling circuitry for combining the general mobile communications device audio signal and the citizen's band radio audio signal.

9. A multi-accessory motorcycle audio system as recited in claim 1, wherein: the audio accessories comprise a geographic designation system having a geographic designation system audio signal and a radar detection system having a radar detection system audio signal; and the input section includes coupling circuitry for combining the geographic designation system audio signal and the radar detection audio signal.

10. A multi-accessory motorcycle audio system as recited in claim 1, wherein the input section includes signal leveling circuitry for leveling the audio signals with respect to one another.

11. A multi-accessory motorcycle audio system as recited in claim 1, wherein the switching section comprises a plurality of switches.

12. A multi-accessory motorcycle audio system as recited in claim 1, wherein the switching section comprises a plurality of analog switches.

13. A multi-accessory motorcycle audio system as recited in claim 1, wherein the controller comprises a programmable controller chip.

14. A multi-accessory motorcycle audio system as recited in claim 1, wherein: said microphone can provide a microphone audio signal; and the instruction set comprises an instruction for controlling the switching section in response to the microphone audio signal.

15. A multi-accessory motorcycle audio system as recited in claim 1, wherein the output section comprises a pair of speakers.

16. A motorcycle audio system switching device for switching a plurality of audio accessories including a music source, a cellular telephone, a radar detection device, a microphone, and a geographic designation system;

an input section comprising a microphone audio signal path and a low pass filter signal path the low pass filter having a low pass filter output, and interconnected with said plurality of audio accessories;

a switching section interconnected with said input section;

a programmable controller comprising an instruction set comprising an instruction for comparing a microphone audio signal with said low pass filter output to obtain a voltage difference signal and an instruction for controlling the switching section in response to the voltage difference signal, and interconnected with said input section and with said switching section and adapted to receive a plurality of audio signals from the input section, and to produce control signals based upon said instruction set;

wherein said switching section is adapted to receive the plurality of audio signals from the input section, to receive the control signals produced by the controller, and to produce an output audio signal; an output section interconnected with said switching section.

17. A motorcycle audio system switching device as recited in claim 16, wherein: the accessories comprise a first level music source and a second level music source; and the input section includes a switch for switching between the first and second music sources.

18. A motorcycle audio system switching device as recited in claim 16, wherein: the audio accessories comprise a general mobile communications device having a general mobile communications device audio signal and a citizen's band radio having a citizen's band radio audio signal; and the input section includes coupling circuitry for combining the general mobile communications device audio signal and the citizen's band radio audio signal.

19. A motorcycle audio system switching device as recited in claim 16, wherein: the audio accessories comprise a geographic designation system having a geographic designation system audio signal and a radar detection system having a radar detection system audio signal; and the input section includes coupling circuitry for combining the geographic designation system audio signal and the radar detection audio signal.

20. A motorcycle audio system switching device as recited in claim 16, wherein the input section includes signal leveling circuitry for leveling the audio signals with respect to one another.

21. A motorcycle audio system switching device as recited in claim 16, wherein the switching section comprises a plurality of switches.

22. A motorcycle audio system switching device as recited in claim 16, wherein the switching section comprises a plurality of analog switches.

23. A motorcycle audio system switching device as recited in claim 16, wherein the controller comprises a programmable controller chip.

24. A motorcycle audio system switching device as recited in claim 16, wherein: said microphone can provide a microphone audio signal; and the instruction set comprises an instruction for controlling the switching section in response to the microphone audio signal.

25. A motorcycle audio system switching device as recited in claim 16, wherein the output section comprises a pair of speakers.

26. A method for switching signals in a motorcycle audio system interconnected to a plurality of audio accessories including a music source~ a cellular telephone, a radar detector, a microphone, and a geographic designation system, the method comprising:
  receiving a plurality of audio signals at an input section comprising a microphone audio signal path and a low pass filter signal path, the low pass filter having a low pass filter output;
  receiving the plurality of audio signals from the input section at a programmable controller comprising an instruction for comparing a microphone audio signal with said low pass filter output to obtain a voltage difference signal and an instruction for controlling the switching section in response to the voltage difference signal, and interconnected with said input section;
  producing a control signal at the controller in response to an instruction set;
  receiving the plurality of audio signals at a switching section interconnected with said input section;
  receiving the control signal from the controller at the switching section; and
  outputting an audio signal from the switching section in response to the received control Signal.

27. A method as recited in claim 26, wherein: the plurality of audio accessories comprise a first level music source and a second level music source; and the method comprises switching between the first and second music sources.

28. A method as recited in claim 26, wherein: the plurality of audio accessories comprise a general mobile communications device having a general mobile communications device audio signal and a citizen's band radio having a citizen's band radio audio signal; and the method comprises combining the general mobile communications device audio signal and the citizen's band radio audio signal.

29. A method as recited in claim 26, wherein: the plurality of audio accessories comprise a geographic designation system having a geographic designation system audio signal and a radar detection system having a radar detection system audio signal;
  and the method comprises combining the geographic designation system audio signal and the radar detection audio signal.

30. A method as recited in claim 26, further including leveling the audio signals with respect to one another.

31. A method as recited in claim 26, wherein:
  said microphone provides a microphone audio signal; and
  the method comprises controlling the switching section in response to the microphone audio signal.

* * * * *